(12) United States Patent
Skobeltsyn et al.

(10) Patent No.: US 9,773,499 B2
(45) Date of Patent: Sep. 26, 2017

(54) ENTITY NAME RECOGNITION BASED ON ENTITY TYPE

(71) Applicant: Google Inc., Mountain View, CA (US)

(72) Inventors: Gleb Skobeltsyn, Ruschlikon (CH); Behshad Behzadi, Zurich (CH)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 14/639,199

(22) Filed: Mar. 5, 2015

(65) Prior Publication Data

US 2015/0371632 A1  Dec. 24, 2015

Related U.S. Application Data

(60) Provisional application No. 62/013,585, filed on Jun. 18, 2014.

(51) Int. Cl.
| | |
|---|---|
| *G10L 15/187* | (2013.01) |
| *G10L 15/26* | (2006.01) |
| *G10L 15/18* | (2013.01) |
| G10L 15/22 | (2006.01) |
| G10L 15/08 | (2006.01) |

(52) U.S. Cl.
CPC ........ *G10L 15/187* (2013.01); *G10L 15/1815* (2013.01); *G10L 15/26* (2013.01); *G10L 2015/088* (2013.01); *G10L 2015/228* (2013.01)

(58) Field of Classification Search
CPC ......... G10L 15/06; G10L 15/07; G10L 15/10; G10L 2015/228; G10L 15/26
USPC ................................ 704/235, 243–244, 251
See application file for complete search history.

(56) References Cited

U.S. PATENT DOCUMENTS

| | | | |
|---|---|---|---|
| 5,524,169 A | 6/1996 | Cohen | |
| 7,146,383 B2 * | 12/2006 | Martin | ................ H04M 3/4931 |
| 7,865,356 B2 * | 1/2011 | Weng | .................... G06F 17/278 |
| | | | 704/1 |
| 8,000,956 B2 * | 8/2011 | Brun | ..................... G06F 17/278 |
| | | | 382/229 |

(Continued)

FOREIGN PATENT DOCUMENTS

WO  2008/046103  4/2008

OTHER PUBLICATIONS

Celikkaya, et al. "Named entity recognition on real data: A preliminary investigation for Turkish." Application of Information and Communication Technologies (AICT), 2013 7th International Conference on. IEEE, Oct. 2013, p. 1-5.*

(Continued)

*Primary Examiner* — James Wozniak
(74) *Attorney, Agent, or Firm* — Fish & Richardson P.C.

(57) ABSTRACT

Methods, systems, and apparatus, including computer programs encoded on a computer storage medium, for recognizing names of entities in speech. In one aspect, a method includes actions of receiving an utterance that includes (i) a first term that indicates a particular entity type, and (ii) a second term that indicates an entity name. Additional actions include obtaining a phonetic representation of the second term and determining that the phonetic representation of the second term matches a particular phonetic representation of a particular canonical name of a set of canonical names associated with a particular entity. Further actions include outputting a reference name associated with the particular entity as a transcription of the second term.

20 Claims, 2 Drawing Sheets

(56) References Cited

U.S. PATENT DOCUMENTS

| | | |
|---|---|---|
| 8,892,443 B2 | 11/2014 | Bocchieri |
| 8,938,392 B2 | 1/2015 | Cross |
| 2002/0111810 A1* | 8/2002 | Khan .................. G01C 21/3608 704/275 |
| 2004/0006481 A1 | 1/2004 | Kiecza |
| 2004/0153306 A1* | 8/2004 | Tanner .................. G06F 17/273 704/4 |
| 2005/0234723 A1* | 10/2005 | Arnold .................. G10L 15/183 704/257 |
| 2006/0173683 A1* | 8/2006 | Roth .................... G10L 15/183 704/251 |
| 2006/0277030 A1 | 12/2006 | Bedworth |
| 2007/0055523 A1* | 3/2007 | Yang ........................ G10L 21/06 704/257 |
| 2007/0124057 A1* | 5/2007 | Prieto .................... G10L 15/26 701/532 |
| 2007/0239460 A1* | 10/2007 | Sheridan ........... G06F 17/30241 704/277 |
| 2008/0177541 A1* | 7/2008 | Satomura ...................... 704/251 |
| 2008/0208574 A1* | 8/2008 | Chen ....................... G10L 13/08 704/221 |
| 2009/0287486 A1* | 11/2009 | Chang .................. G10L 15/063 704/235 |
| 2010/0100371 A1* | 4/2010 | Yuezhong ........... G06F 17/2881 704/9 |
| 2011/0022292 A1* | 1/2011 | Shen ................... G10L 15/1815 701/532 |
| 2011/0173000 A1* | 7/2011 | Yamamoto .......... G10L 15/1815 704/240 |
| 2012/0232904 A1* | 9/2012 | Zhu ........................ G10L 15/22 704/254 |
| 2013/0332162 A1* | 12/2013 | Keen ...................... G10L 15/26 704/235 |
| 2013/0332164 A1* | 12/2013 | Nalk .................... G10L 15/187 704/243 |
| 2014/0358544 A1* | 12/2014 | Printz .................... G10L 15/19 704/254 |
| 2015/0066474 A1* | 3/2015 | Yi ........................ G06F 17/277 704/8 |
| 2015/0088511 A1* | 3/2015 | Bharadwaj ............ G10L 15/183 704/244 |
| 2015/0095024 A1* | 4/2015 | Tsujino .................. G10L 15/22 704/231 |
| 2015/0286629 A1* | 10/2015 | Abdel-Reheem ... G06F 17/2827 704/9 |
| 2015/0339288 A1* | 11/2015 | Baker ...................... G06F 17/00 704/9 |
| 2015/0340024 A1* | 11/2015 | Schogol ................ G10L 15/26 704/235 |
| 2015/0348565 A1* | 12/2015 | Rhoten .................. G10L 21/00 704/270.1 |

OTHER PUBLICATIONS

Extended European Search Report issued in European Application No. 15165933.1 on Jan. 5, 2016, 8 pages.

* cited by examiner

ENTITY NAME RECOGNITION BASED ON ENTITY TYPE

CROSS REFERENCE TO RELATED APPLICATION

This application claims the benefit of U.S. Provisional Application Ser. No. 62/013,585, filed on Jun. 18, 2014, which is incorporated by reference.

TECHNICAL FIELD

This disclosure generally relates to speech recognition and, according to one example implementation, to recognizing a proper name in an utterance.

BACKGROUND

Voice commands may include proper names. For instance, a user may say "Navigate to Pete's Pizza Palace restaurant," in order to request that a natural language processing system provide directions to a restaurant named "Pete's Pizza Palace."

SUMMARY

Some voice commands include proper names that may be difficult to accurately transcribe using conventional speech recognizers. For instance, no matter how clearly a user speaks, a conventional speech recognizer might transcribe the voice command "Navigate to CITYZEN restaurant in Washington D.C." as "Navigate to CITIZEN restaurant in Washington D.C." Such a transcription might result in a natural language processing system outputting erroneous or nonsensical results.

Given the correctly transcribed terms "restaurant" and "Washington D.C.," from this example voice command, and given the phonetic transcription, "SI-tee-< >-ze-en," of the portion of the voice command that corresponds to the proper name, the enhanced natural language processing system described in this specification may accurately transcribe this portion of the voice command by replacing the inaccurately transcribed proper name "citizen" with a name of an entity, "CityZen," that (i) matches the "restaurant" entity type, (ii) is associated with the "Washington D.C." location, and that (iii) is pre-associated with a phonetic representation that matches the phonetic transcription of the portion of the voice command that corresponds to the proper name. As used by this specification, an "entity" may refer to any person, place, object, event, or concept.

In some aspects, the subject matter described in this specification may be embodied in methods that may include the actions of receiving an utterance that includes (i) a first term that indicates a particular entity type, and (ii) a second term that indicates an entity name. Additional actions include obtaining a phonetic representation of the second term and determining that the phonetic representation of the second term matches a particular phonetic representation of a particular canonical name of a set of canonical names associated with a particular entity. Further actions include outputting a reference name associated with the particular entity as a transcription of the second term.

Other versions include corresponding systems, apparatus, and computer programs, configured to perform the actions of the methods, encoded on computer storage devices.

These and other versions may each optionally include one or more of the following features. For instance, in some implementations obtaining, for each of the one or more entities, a phonetic representation of each canonical name of the set of canonical names for the entity includes generating the phonetic representations for each canonical name by applying one or more pronunciation rules to each canonical name.

In some aspects, determining that the phonetic representation of the second term matches a particular phonetic representation of a particular canonical name of a set of canonical names associated with a particular entity includes determining a match score based on a distance between the phonetic representation of the second term and the particular phonetic representation and determining that the match score satisfies a predetermined threshold match score.

In certain aspects, actions include determining a candidate transcription of the utterance, the candidate transcription including a type term corresponding to the first term and a name term corresponding to the second term. Additional actions include determining a geographic location corresponding to the utterance and determining that the name term does not match a reference name of an entity (i) of the entity type corresponding to the type term and (ii) in a geographic location matching the geographic location, where determining that the phonetic representation of the second term matches a particular phonetic representation of a particular canonical name of a set of canonical names associated with a particular entity is in response to determining that the name term does not match the reference name of the entity (i) of the entity type corresponding to the type term and (ii) in the geographic location matching the geographic location.

In some implementations, determining a geographic location corresponding to the utterance includes determining a term in the candidate transcription that corresponds to the geographic location. In some aspects, determining a geographic location corresponding to the utterance includes determining a location in which utterance was said. In certain aspects, obtaining a phonetic representation of the second term includes generating the phonetic representation of the second term by applying one or more pronunciation rules to the name term. In some implementations, a reference name includes an official name and a canonical name includes an official name or an unofficial name. In some aspects, an entity includes at least one of a person, place, object, event, or concept.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
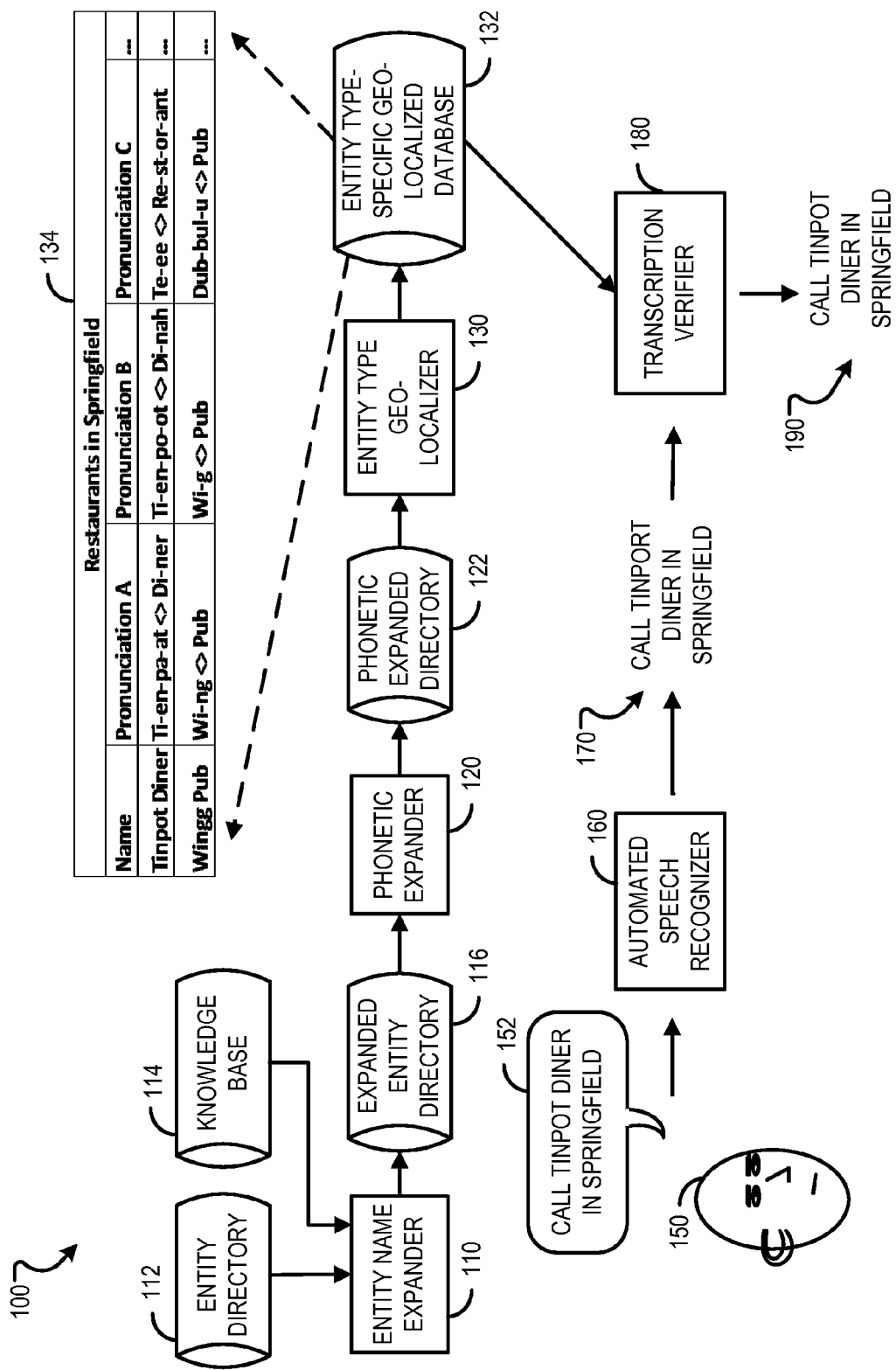
FIG. 1 is a block diagram of an example system for recognizing names of entities in speech.

FIG. 1 is a block diagram of an example system 100 for recognizing names of entities in speech. Generally, the system 100 includes an entity directory 112 that lists various entities, a knowledge base 114 that stores an entity-relationship model relating to the attributes of various entities, including reference entity names, alternate entity names, and locations associated with certain entities. The system 100 also includes an entity name expander 110 that, using the knowledge base 114, identifies other canonical entity names associated with entities stored in the entity directory 112, and a phonetic expander 120 that generates a phonetic expanded directory 122 from the expanded entity directory 116. The system 100 further includes an entity type geo-localizer 130 that generates an entity type-specific, geo-localized entity database 132, an automated speech recognizer 160 that generates a candidate transcription 170 for an utterance 152 from a user 150, and a transcription verifier 180 that verifies the candidate transcription 170 using the entity type-specific, geo-localized entity database 132 and outputs a verified transcription 190.

In more detail, the entity directory 112 may be a database that includes records for entities. For example, the entity directory 112 may be a yellow pages-type listing of businesses in a particular area. Each record may correspond to a particular entity and include (i) a reference name, (ii) a geographic location, and (iii) one or more entity types for the particular entity. For example, the entity directory 112 may include a record for an entity that has a reference name "TINPOT DINER," located at "100 MAIN ST, SPRINGFIELD, Mo.," and of the entity type "RESTAURANT."

A reference name may be an official or legal name of the entity. For example, a restaurant may be named "TINPOT DINER," even though the restaurant may be known colloquially by other names, such as "TIN DINER," "TP DINER," or "TINPOT RESTAURANT." The geographic location may be indicated by, for example, a street address or latitude and longitude coordinates, or both.

The knowledge base 114 may be an entity-relationship database that, among other things, includes information indicating associations between reference names of an entity and canonical names of the entity. Canonical names may be names by which the entity may be referred. For example, the knowledge base 114 may indicate that the entity with a reference name "TINPOT DINER" is associated with canonical names "TIN DINER," "TP DINER," and "TINPOT RESTAURANT." The knowledge base 114 may be generated from a variety of information, e.g., social network information, review services, websites, and aggregated user queries.

The entity name expander 110 may access the records in the entity directory 112 and information in the knowledge base 114 to generate an expanded entity directory 116. The expanded entity directory 116 may include records corresponding to the records in the entity directory 112, with additional information indicating a set of one or more canonical names for each entity, where the set of one or more canonical names for each entity includes the reference name of the entity.

The entity name expander 110 may generate the expanded entity directory 116 by accessing each record in the entity directory 112, and for each record, identifying canonical names indicated by the knowledge base 114 as associated with the reference name for the record. For example, the entity name expander 110 may access the record for the entity with the reference name "TINPOT DINER," determine that the knowledge base 114 indicates that an entity with the reference name "TINPOT DINER" is associated with the canonical names "TIN DINER," "TP DINER," and "TINPOT RESTAURANT," and generate a record in the expanded entity directory 116 that indicates (i) information in the record in the entity directory 112 for the entity with the reference name "TINPOT DINER" and (ii) the set of canonical names "TINPOT DINER," "TIN DINER," "TP DINER," and "TINPOT RESTAURANT."

The phonetic expander 120 may access the records in the expanded entity directory 116 to generate a phonetic expanded directory 122. The phonetic expanded directory 122 may include records corresponding to the records in the expanded entity directory 116, with additional information indicating possible phonetic representations of the canonical names.

The phonetic expander 120 may access each record in the expanded entity directory 116, and for each reference name and each canonical name in the record, generate one or more phonetic representations. For example, the phonetic expander 120 may access the record for the entity "TINPOT DINER" in the expanded entity directory 116, access the reference name "TINPOT DINER," generate the phonetic representation "TI-EN-PA-AT< >DI-NAH" for a phonetic representation for a correct recognition of "TINPOT," generate an additional phonetic representation "TI-EN-PO-OT< >DI-NAH" for a phonetic representation of an incorrect recognition of "TINPOT" as "TIN PORT," access the canonical name "T RESTAURANT," and generate the phonetic representation "TE-EE< >RE_ST_OR_ANT."

The phonetic expander 120 may generate the phonetic representations by applying one or more rules defining possible pronunciations of words. For example, the phonetic expander 120 may apply a rule that defines that "POT" may be pronounced as "PA-AT" and apply another rule that defines that "POT" may be pronounced as "PO-OT."

The entity type geo-localizer 130 may access the records in the phonetic expanded directory 122 to generate at least one entity type-specific, geo-localized entity database 132. The entity type-specific, geo-localized entity database 132 may be a database that includes records corresponding to the phonetic expanded directory 122 for a particular entity type in a particular geographic area. For example, the entity type-specific, geo-localized entity database 132 may include records for entities with the entity type "RESTAURANT" and located in "SPRINGFIELD."

The entity type geo-localizer 130 may generate the entity type-specific, geo-localized entity databases 132 by filtering the records by entity type and location and generating an entity type-specific, geo-localized entity databases for each different pair of entity type and location, e.g., a second entity type-specific, geo-localized entity database for the entity type "MUSEUM" and the location "SPRINGFIELD," a third entity type-specific, geo-localized entity database for the entity type "RESTAURANT" and the location "GREENVILLE," and a fourth entity type-specific, geo-localized entity database for the entity type "MUSEUM" and the location "GREENVILLE."

The automated speech recognizer 160 may receive an utterance 152 from a user 150 and generate a candidate transcription 170. For example, the automated speech recognizer 160 may receive the utterance "CALL TINPOT DINER IN SPRINGFIELD" and generate the candidate transcription "CALL TINPORT DINER IN SPRINGFIELD" 170. The automated speech recognizer 160 may generate the candidate transcription 170 using acoustic models and language models.

The transcription verifier 180 may verify the candidate transcription 170 and output a verified transcription 190. The transcription verifier 180 may determine whether the candidate transcription 170 includes a first term that indicates a particular entity type, e.g., a type term, and a second term that indicates an entity name, e.g., a name term. For example, the transcription verifier 180 may determine that the candidate transcription 170 includes the type term "DINER" that indicates an entity type of "RESTAURANT." Other terms that the transcription verifier 180 may try to identify in the candidate transcription 170 that may indicate the entity type of "RESTAURANT" may include "RESTAURANT," "EATERY," "CAFE," "COFFEEHOUSE," "STEAKHOUSE," "BRASSERIE," and "BISTRO." The transcription verifier 180 may determine if the candidate transcription 170 includes other terms associated with other entity types, e.g., a person, place, object, event, or concept.

In some implementations, the name term and the type term may overlap. For example, the term "DINER" in "TINPOT DINER" may be both a name term and a type term as "DINER" is part of the name of the entity "TINPOT DINER" and "DINER" indicates that the entity "TINPOT DINER" is a restaurant.

The transcription verifier 180 may determine that the candidate transcription 170 includes the term "TINPORT" that is likely to be a name term. The transcription verifier 180 may determine that "TINPORT" is likely to be a name term based on grammar rules. For example, the transcription verifier 180 may determine that "TINPORT" is likely to indicate an entity name because "TINPORT" is the subject of the verb "CALL," which triggers the voice command for calling, and appears immediately before the term "DINER," which is a type term.

In response to determining that the candidate transcription includes a first term that indicates a particular entity type and a second term that indicates an entity name, the transcription verifier 180 may determine a geographic location associated with the utterance 152 and verify whether an entity with the name indicated by the second term and of the particular entity type indicated by the first term is valid for the geographic location.

The transcription verifier 180 may determine the geographic location associated with the utterance 152 based on determining that the candidate transcription includes a term that indicates a geographic location, e.g., the term "SPRINGFIELD" indicating the geographic location "SPRINGFIELD." Additionally or alternatively, the transcription verifier 180 may determine the geographic location associated with the utterance 152 based on determining a current location of the user 150, e.g., determining that the user is in the geographic location "SPRINGFIELD" via global positioning system information from a device currently being used by the user 150.

The transcription verifier 180 may then determine an entity type-specific, geo-localized entity database 132 that corresponds to the candidate transcription. For example, the transcription verifier 180 may determine that the entity type-specific, geo-localized entity database 132 for entities of the entity type "RESTAURANT" in the geographic area "SPRINGFIELD" corresponds to the candidate transcription based on a determined geographic area of "SPRINGFIELD" associated with the utterance 152 and a determined entity type of "RESTAURANT" for the candidate transcription.

The transcription verifier 180 may then determine a phonetic representation of the name term. For example, the transcription verifier 180 may determine a phonetic representation of "TI-EN-PO-RT< >DI-NER" for the name term "TINPORT DINER." The transcription verifier 180 may determine the phonetic representation by applying one or more pronunciation rules to the name term to generate the phonetic representation of the name term.

The transcription verifier 180 may then determine if the phonetic representation of the name term matches a particular phonetic representation for an entity stored in the entity type-specific, geo-localized entity database 132 determined to correspond to the candidate transcription. For example, the transcription verifier 180 may determine that the phonetic representation "TI-EN-PO-RT< >DI-NER" matches the pronunciation "TI-EN-PO-OT< >DI-NER" stored in the entity type-specific, geo-localized entity database 132 for the entity with the reference name "TINPOT DINER."

The transcription verifier 180 may determine that a phonetic representation of the name term matches a particular phonetic representation for an entity stored in the entity type-specific, geo-localized entity database 132 determined to correspond to the candidate transcription based on a match score. The match score may indicate a level of match between the utterance 152 and a particular entity stored in the entity type-specific, geo-localized entity database 132. For example, a match score of 20% may indicate a poor match between the utterance 152 and a particular entity and a match score of 97% may indicate a good match between the utterance 152 and the particular entity.

The transcription verifier 180 may determine the match score based on one or more of (i) a phonetic distance between the phonetic representation of the name term and the particular phonetic representation for the entity, (ii) a popularity of the entity, and (iii) a proximity of the entity to the geographic location associated with the utterance 152. For example, a greater phonetic distance may result in a lower match score, a greater popularity of the entity may result in a greater match score, and a greater proximity of the entity to the geographic location associated with the utterance 152 may result in a greater match score.

In some implementations, the transcription verifier 180 may determine the popularity of the entity based on the number of reviews the entity has as indicated by the knowledge base 114. For example, entities that are associated with more reviews may be determined to be more popular and entities that are associated with fewer reviews may be determined to be less popular.

The transcription verifier 180 may determine that a phonetic representation of the name term matches a particular phonetic representation for an entity stored in the entity type-specific, geo-localized entity database 132 determined to correspond to the candidate transcription based on a match score by determining an entity that is associated with the highest match score with the utterance 152 and determining a match if the match score for that entity satisfies a predetermined criteria. In some implementation, the predetermined criteria may be that the highest match score, e.g., 95%, is above a predetermined match score threshold, e.g., 90%.

In response to determining that the phonetic representation of the name term matches a particular phonetic representation, the transcription verifier 180 may generate the verified transcription 190 by replacing the name term with the reference name in the candidate transcription. For example, the transcription verifier 180 may replace "TINPORT DINER" in the candidate transcription 170 "CALL TINPORT DINER IN SPRINGFIELD" with the reference name "TINPOT DINER" and output "CALL TINPOT DINER IN SPRINGFIELD." The system 100 may then process the verified transcription 190. For example, the system 100 may initiate a call to a phone number associated with the entity "TINPOT DINER IN SPRINGFIELD."

Additionally or alternatively, in some implementations, the system 100 may determine the match score based on directly compare acoustic features of the utterance 152 from the user 150 with reference names of two or more entities with stored phonetic representations that best match the determined phonetic representation for the name term in the candidate transcription 170. For example, the transcription verifier 180 may provide the phonetic representations for "TINPOT DINER" and "TEMPO DINER," which are both reference names of entities that are restaurants located in the geographic area "SPRINGFIELD," to the automated speech recognizer 160 for the automated speech recognizer 160 to determine an acoustic score representing a level of correspondence between the phonetic representation and the acoustic features of the utterance 152. The transcription verifier 180 may then increase the match score based on acoustic scores indicating greater correspondence and reduce the match score based on acoustic scores indicating lesser correspondence.

Different configurations of the system 100 may be used where functionality of the entity name expander 110, the phonetic expander 120, the entity type geo-localizer 130, the automated speech recognizer 160, and the transcription verifier 180 may be combined, further separated, distributed, or interchanged. The system 100 may be implemented in a single device or distributed across multiple devices.

Figure 2:
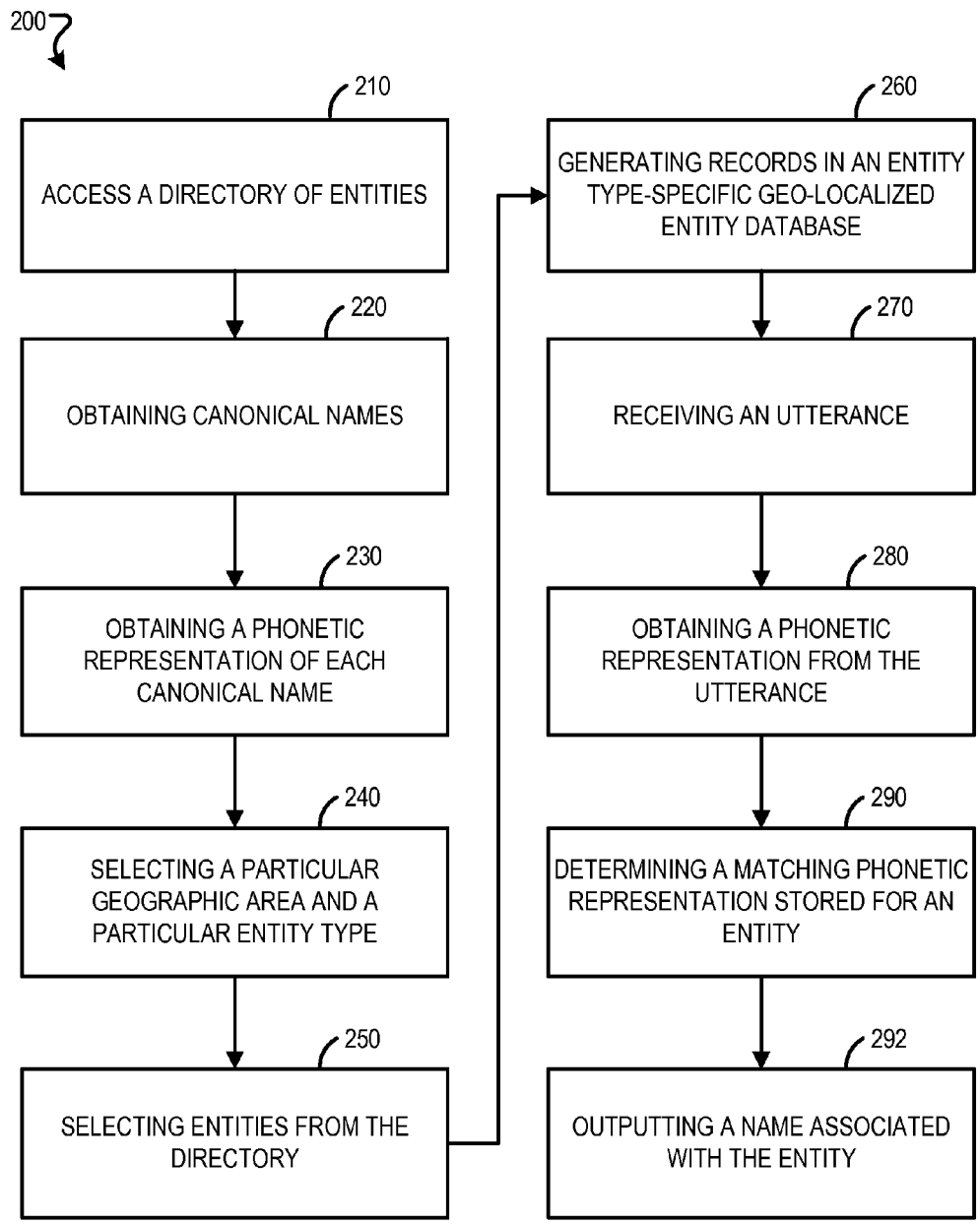
FIG. 2 is a flowchart of an example process for recognizing names of entities in speech.

FIG. 2 is a flowchart of an example process 200 for recognizing names of entities in speech. The following describes the processing 200 as being performed by components of the system 100 that are described with reference to FIG. 1. However, the process 200 may be performed by other systems or system configurations.

The process 200 may include accessing a directory of entities that indicates, for each entity, (i) a reference name of the entity, (ii) an entity type associated with the entity, and (iii) a geographic location associated with the entity (210). For example, the entity name expander 110 may access the entity directory 112.

The process 200 may include obtaining, for each of one or more of the entities, a set of one or more canonical names for the entity, wherein the set of canonical names for the entity includes the reference name for the entity (220). For example, the entity name expander 110 may generate an expanded entity directory 116 that includes a set of one or more canonicals names for each entity by including in each set the reference name of the entity and one or more canonical names that the knowledge base 114 indicates are associated with the entity. In a particular example, the entity name expander 110 may obtain a set of canonical names of "WINGG PUBB" and "W PUB" for the entity with the reference name "WINGG PUBB."

The process 200 may include obtaining, for each of the one or more entities, a phonetic representation of each canonical name of the set of canonical names for the entity (230). For example, the phonetic expander 120 may apply one or more pronunciation rules to the sets of canonical names in the expanded entity director 116 to generate the phonetic expanded directory 122. In a particular example, the phonetic expander 120 may generate the phonetic representation of "WI-NG< >PUB" and "WI-G< >PUB" for the canonical name "WINGG PUB" and the phonetic representation "DUB-BUL-U< >PUB" for the canonical name "W PUB."

The process 200 may include selecting a particular geographic area and a particular entity type (240). For example, the entity type geo-localizer 130 may select each different pair of geographic area and entity type associated with the entities. In a particular example, the entity type geo-localizer 130 may select the pair of "SPRINGFIELD" and "RESTAURANTS."

The process 200 may include selecting entities from the directory that (i) have an entity type that matches the particular entity type, and (ii) have a geographic location that matches the particular geographic area (250). For example, the entity type geo-localizer 130 may filter the phonetic expanded directory 122 based on the particular entity type and particular geographic area. In a particular example, the entity type geo-localizer 130 may filter the phonetic expanded directory 122 to identify all entries that are for entities that are both in a geographical area of "SPRINGFIELD" and of an entity type of "RESTAURANT."

The process 200 may include generating, for each of the selected entities, a record in an entity type-specific, geo-localized entity database, wherein, for each of the selected entities, the record indicates at least (i) a reference name of the selected entity, (ii) a respective phonetic representation of each canonical name of the set of canonical names for the selected entity (260). For example, the entity type geo-localizer 130 may access the phonetic expanded directory 122 to generate the entity type-specific geo-localized database 132. In a particular example, the entity type geo-localizer 130 may generate the entity type-specific geo-localized database 132 for entities in the geographical area of "SPRINGFIELD" and of the entity type of "RESTAURANT."

The process 200 may include receiving an utterance that includes (i) a first term that indicates the particular entity type, and (ii) a second term that indicates an entity name (270). For example, the automated speech recognizer 160 may receive an utterance 152 from the user 150. The utterance 152 may be received by the automated speech recognizer 160 in the form of acoustic features generated by an acoustic to electric transducer, e.g., a microphone. In a particular example, the automated speech recognizer 160 may receive an utterance of "NAVIGATE TO W PUB."

The process 200 may include obtaining a phonetic representation of the second term (280). For example, the transcription verifier 180 may generate a phonetic representation of a name term in a candidate transcription 170 output by the automated speech recognizer 160 by applying one or more pronunciation rules to the name term. In a particular example, the transcription verifier 180 may generate the phonetic representation of "DUB-BUL-U< >PUB" for the name term "W PUB."

The process 200 may include determining that the phonetic representation of the second term matches a particular phonetic representation of a particular canonical name of a set of canonical names associated with a particular entity (290). For example, the transcription verifier 180 may determine that the phonetic representation of the name term in the candidate transcription 170 matches a particular phonetic representation for an entity stored in the entity type-specific geo-localized database 132. In a particular example, the transcription verifier 180 may determine that the generated phonetic representation "DUB-BUL-U< >PUB" matches the particular phonetic representation "DUB-BUL-U< >PUB" stored in the entity type-specific geo-localized database 132 for the entity "WINGG PUB" based on determining a match score of 98% between the utterance 152 and the entity is greater than a predetermined threshold of 90%.

The transcription verifier 180 may determine the match score of 98% based on determining a phonetic distance of zero between the generated phonetic representation "DUB-BUL-U< >PUB" and the stored particular phonetic representation "DUB-BUL-U< >PUB," determining that the entity "WINGG PUB" is very popular based on there being many reviews for the entity, determining that the entity "WINGG PUB" is less than two miles from the user's current location as indicated by global positioning system information from the user's device, and determining a high acoustic score indicating that the particular phonetic representation "DUB-BUL-U< >PUB" for the entity corresponds very well to the acoustic features for the utterance 152.

The process 200 may include in response to determining that the phonetic representation of the second term matches the particular phonetic representation of the particular canonical name of the set of canonical names associated with the particular entity, outputting the reference name associated with the particular entity as the transcription of the second term (292). For example, the transcription verifier 180 may generate a verified transcription 190 by replacing the name term in the candidate transcription 170 with the reference name of the entity associated with the matching particular phonetic representation. In a particular example, the transcription verifier 180 may generate the verified transcription "NAVIGATE TO WINGG PUB" by replacing the name term "W PUB" in the candidate transcription "NAVIGATE TO W PUB" with the reference name "WINGG PUB."

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
   accessing a directory of entities that indicates, for each entity, (i) a reference name of the entity, (ii) an entity type associated with the entity, and (iii) a geographic location associated with the entity;
   obtaining, for each of one or more of the entities, a set of one or more canonical names for the entity, wherein the set of canonical names for the entity includes the reference name for the entity;
   obtaining, for each of the one or more entities, a phonetic representation of each canonical name of the set of canonical names for the entity;
   selecting a particular geographic area and a particular entity type;
   selecting entities from the directory that (i) have an entity type that matches the particular entity type, and (ii) have a geographic location that matches the particular geographic area;
   generating, for each of the selected entities, a record in an entity type-specific, geo-localized entity database for the particular geographic area, wherein, for each of the selected entities, the record indicates at least (i) a reference name of the selected entity, (ii) a respective phonetic representation of each canonical name of the set of canonical names for the selected entity;
   receiving an utterance that includes (i) a first term that indicates the particular entity type, (ii) a second term that indicates an entity name, and (iii) a third term that is associated with the particular geographic area;
   determining a candidate transcription of the utterance, the candidate transcription including a type term corresponding to the first term, a name term corresponding to the second term, and a geographic term corresponding to the third term;
   determining that the candidate transcription includes (i) the type term, (ii) the name term, and (iii) the geographic term;
   in response to determining that the candidate transcription includes (i) the type term, (ii) the name term, and (iii) the geographic term, determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity; and
   in response to determining that, among the phonetic representations indicated in the records in the entity-type specific, geo-localized entity database for the particular geographic area, the phonetic representation of the second term matches the particular phonetic representation of the particular canonical name of the set of canonical names associated with the particular entity, outputting the reference name associated with the particular entity as a transcription of the second term.

2. The method of claim 1, wherein obtaining, for each of the one or more entities, a phonetic representation of each canonical name of the set of canonical names for the entity, comprises:
   generating the phonetic representations for each canonical name by applying one or more pronunciation rules to each canonical name.

3. The method of claim 1, determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity, comprises:
   determining a match score based on a distance between the phonetic representation of the second term and the particular phonetic representation; and determining that the match score satisfies a predetermined threshold match score.

4. The method of claim 1, comprising:
determining a candidate transcription of the utterance, the candidate transcription including a type term corresponding to the first term and a name term corresponding to the second term;
determining a geographic location corresponding to the utterance; and
determining that the name term does not match a reference name of an entity (i) of the entity type corresponding to the type term and (ii) in a geographic location matching the geographic location,
wherein determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity is in response to determining that the name term does not match the reference name of the entity (i) of the entity type corresponding to the type term and (ii) in the geographic location matching the geographic location.

5. The method of claim 4, wherein determining a geographic location corresponding to the utterance, comprises:
determining a term in the candidate transcription that corresponds to the geographic location.

6. The method of claim 4, wherein determining a geographic location corresponding to the utterance, comprises:
determining a location in which the utterance was said.

7. The method of claim 4, wherein determining a phonetic representation of the second term from the name term in the candidate transcription, comprises:
generating the phonetic representation of the second term by applying one or more pronunciation rules to the name term.

8. The method of claim 1, wherein a reference name comprises an official name and a canonical name comprises an official name or an unofficial name.

9. The method of claim 1, wherein an entity comprises at least one of a person, place, object, event, or concept.

10. A non-transitory computer-readable medium storing instructions executable by one or more computers which, upon such execution, cause the one or more computers to perform operations comprising:
receiving an utterance that includes (i) a first term that indicates the particular entity type, (ii) a second term that indicates an entity name, and (iii) a third term that is associated with the particular geographic area;
determining a candidate transcription of the utterance, the candidate transcription including a type term corresponding to the first term, a name term corresponding to the second term, and a geographic term corresponding to the third term;
determining that the candidate transcription includes (i) the type term, (ii) the name term, and (iii) the geographic term;
in response to determining that the candidate transcription includes (i) the type term, (ii) the name term, and (iii) the geographic term, determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity; and in response to determining that, among the phonetic representations indicated in the records in the entity-type specific, geo-localized entity database for the particular geographic area, the phonetic representation of the second term matches the particular phonetic representation of the particular canonical name of the set of canonical names associated with the particular entity, outputting the reference name associated with the particular entity as a transcription of the second term.

11. The medium of claim 10, wherein determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity, comprises:
determining a match score based on a distance between the phonetic representation of the second term and the particular phonetic representation; and
determining that the match score satisfies a predetermined threshold match score.

12. The medium of claim 10, the operations comprising:
determining a candidate transcription of the utterance, the candidate transcription including a type term corresponding to the first term and a name term corresponding to the second term;
determining a geographic location corresponding to the utterance; and
determining that the name term does not match a reference name of an entity (i) of the entity type corresponding to the type term and (ii) in a geographic location matching the geographic location,
wherein determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity is in response to determining that the name term does not match the reference name of the entity (i) of the entity type corresponding to the type term and (ii) in the geographic location matching the geographic location.

13. The medium of claim 12, wherein determining a geographic location corresponding to the utterance, comprises:
determining a term in the candidate transcription that corresponds to the geographic location.

14. The medium of claim 12, wherein determining a geographic location corresponding to the utterance, comprises:
determining a location in which the utterance was said.

15. The medium of claim 12, wherein determining a phonetic representation of the second term from the name term in the candidate transcription, comprises:
generating the phonetic representation of the second term by applying one or more pronunciation rules to the name term.

16. The medium of claim 10, wherein a reference name comprises an official name and a canonical name comprises an official name or an unofficial name.

17. A system comprising:
one or more computers; and
one or more storage devices storing instructions that are operable, when executed by the one or more computers, to cause the one or more computers to perform operations comprising:
  receiving an utterance that includes (i) a first term that indicates the particular entity type, (ii) a second term that indicates an entity name, and (iii) a third term that is associated with the particular geographic area;
  determining a candidate transcription of the utterance, the candidate transcription including a type term corresponding to the first term, a name term corresponding to the second term, and a geographic term corresponding to the third term;
  determining that the candidate transcription includes (i) the type term, (ii) the name term, and (iii) the geographic term;
  in response to determining that the candidate transcription includes (i) the type term, (ii) the name term, and (iii) the geographic term, determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity; and
  in response to determining that, among the phonetic representations indicated in the records in the entity-type specific, geo-localized entity database for the particular geographic area, the phonetic representation of the second term matches the particular phonetic representation of the particular canonical name of the set of canonical names associated with the particular entity, outputting the reference name associated with the particular entity as a transcription of the second term.

18. The system of claim 17, wherein determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity, comprises:
  determining a match score based on a distance between the phonetic representation of the second term and the particular phonetic representation; and
  determining that the match score satisfies a predetermined threshold match score.

19. The system of claim 17, the operations comprising:
  determining a candidate transcription of the utterance, the candidate transcription including a type term corresponding to the first term and a name term corresponding to the second term;
  determining a geographic location corresponding to the utterance; and
  determining that the name term does not match a reference name of an entity (i) of the entity type corresponding to the type term and (ii) in a geographic location matching the geographic location,
  wherein determining that, among the phonetic representations indicated in the records in the entity-type specific, geo-localized entity database for the particular geographic area, a phonetic representation of the second term matches a particular phonetic representation of a particular canonical name of a set of canonical names associated with a particular entity is in response to determining that the name term does not match the reference name of the entity (i) of the entity type corresponding to the type term and (ii) in the geographic location matching the geographic location.

20. The system of claim 19, wherein determining a geographic location corresponding to the utterance, comprises:
  determining a term in the candidate transcription that corresponds to the geographic location.

* * * * *